(12) United States Patent
Dearth et al.

(10) Patent No.: US 8,201,179 B2
(45) Date of Patent: Jun. 12, 2012

(54) MULTI-THREADED SHARED STATE VARIABLE CONTROL

(75) Inventors: Glenn A. Dearth, Groton, MA (US); Stephen A. Jay, Chelmsford, MA (US)

(73) Assignee: Oracle America, Inc., Redwood City, CA (US)

( * ) Notice: Subject to any disclaimer, the term of this patent is extended or adjusted under 35 U.S.C. 154(b) by 1402 days.

(21) Appl. No.: 11/417,427

(22) Filed: May 4, 2006

(65) Prior Publication Data

US 2007/0261057 A1     Nov. 8, 2007

(51) Int. Cl.
*G06F 9/46* (2006.01)
(52) U.S. Cl. .................. 718/104; 718/100; 718/107
(58) Field of Classification Search .................. 718/104
See application file for complete search history.

(56) References Cited

U.S. PATENT DOCUMENTS

| | | | |
|---|---|---|---|
| 2003/0225816 A1* | 12/2003 | Morrow et al. | 709/107 |
| 2005/0038980 A1* | 2/2005 | Rodgers et al. | 712/220 |
| 2007/0226740 A1* | 9/2007 | Li et al. | 718/102 |

* cited by examiner

*Primary Examiner* — Kenneth Tang
(74) *Attorney, Agent, or Firm* — Osha • Liang LLP

(57) ABSTRACT

A method for controlling sharing of resources in a multi-threaded environment includes entering a finite state machine state sequence; controlling resource-sharing threads using the finite state machine state sequence; and exiting the finite state machine state sequence when shared resource control is complete. A multi-threaded shared resource control system includes a finite state machine configured to control multi-threaded access to shared resources; a plurality of producer threads regulated by the finite state machine; and a plurality of consumer threads regulated by the finite state machine. A non-transitory computer usable medium having computer readable program code embodied therein for causing a computer system to execute a method for controlling sharing of resources in a multi-threaded environment includes entering a finite state machine state sequence; controlling resource-sharing threads using the finite state machine state sequence; and exiting the finite state machine state sequence when shared resource control is complete.

10 Claims, 5 Drawing Sheets

MULTI-THREADED SHARED STATE VARIABLE CONTROL

BACKGROUND

Real-time multithreaded control environments require careful synchronization of control sequences affecting system shared resources. These control sequence interactions can be modeled after the well known producer/consumer model. In a producer/consumer relationship, a producer control thread initiates a control action, which is responded to by a control action from a consumer control thread. This causal connection between producer and consumer threads is a more general form of the typical producer/consumer example, where a producer first places data in a shared buffer and a consumer subsequently reads the data from the shared buffer.

In most real world situations, the producer and consumer control threads operate independently for extended periods of time. If proper care is not taken, timing and interaction issues can cause incorrect behavior or even result in a system crash. As a result, the actions of the producer and consumer must be synchronized carefully to maintaining program correctness. This synchronization may be implemented using a mutual exclusion policy, where only one process has access to a shared resource, or "critical section," at a time.

In addition to operating independently from one another, the producer and consumer also tend to be isolated from one another. The isolation can be a physical isolation (e.g. producer and consumer are on different systems), or the isolation can be a logical/virtual one (e.g. producer and consumer have different regulation mechanisms). Regardless of the type of isolation, producer control source code (i.e. the specific tangible sequence of commands, instructions or states that implement the control procedure) is generally developed independently from consumer control source code. However, during execution, control loops for producers and consumers are no longer completely independent because they must synchronize themselves in order to maintain program correctness.

Producers and consumers may synchronize by transferring filtered views of their respective internal states to one another using sideband channels. The filtering effect is a function of the separation between the producer and consumer and causes information loss as the validity of real-time data decays over the course of transmission. When loss of synchronization occasionally occurs, either through signal corruption or from unexpected temporal sequences that expose latent bugs, the system may degrade into an unusable state. This loss of synchronization can be devastating in certain critical applications. Furthermore, as the number of producers and consumers increase, the sideband signaling can become unwieldy.

Alternatively, the producer and consumer may transfer explicit references to one another's internal states by passing messages. While passing references may fix some scaling problems associated with sideband signaling, other issues may still occur from passing and/or replicating the message, including bandwidth, throughput, and latency delays.

Another notable issue with producer/consumer models is that because of the separation in control sequences, the state space of the system is now the product space of the individual control loops. For example, if a producer had m states and a consumer had n states, the state space of the system would consist of (m×n) states. This product space has the negative side effect of significantly increasing the validation effort because more system states need to be tested.

SUMMARY

In general, in one aspect, the invention relates to a method for controlling sharing of resources in a multi-threaded environment comprising entering a finite state machine state sequence, controlling resource-sharing threads using the finite state machine state sequence, and exiting the finite state machine state sequence when shared resource control is complete.

In general, in one aspect, the invention relates to a multi-threaded shared resource control system comprising a finite state machine configured to control multi-threaded access to shared resources, a plurality of producer threads regulated by the finite state machine, and a plurality of consumer threads regulated by the finite state machine.

In general, in one aspect, the invention relates to a computer usable medium having computer readable program code embodied therein for causing a computer system to execute a method for controlling sharing of resources in a multi-threaded environment, comprising entering a finite state machine state sequence, controlling resource-sharing threads using the finite state machine state sequence, and exiting the finite state machine state sequence when shared resource control is complete.

Other aspects and advantages of the invention will be apparent from the following description and the appended claims.

DETAILED DESCRIPTION

Figure 1:
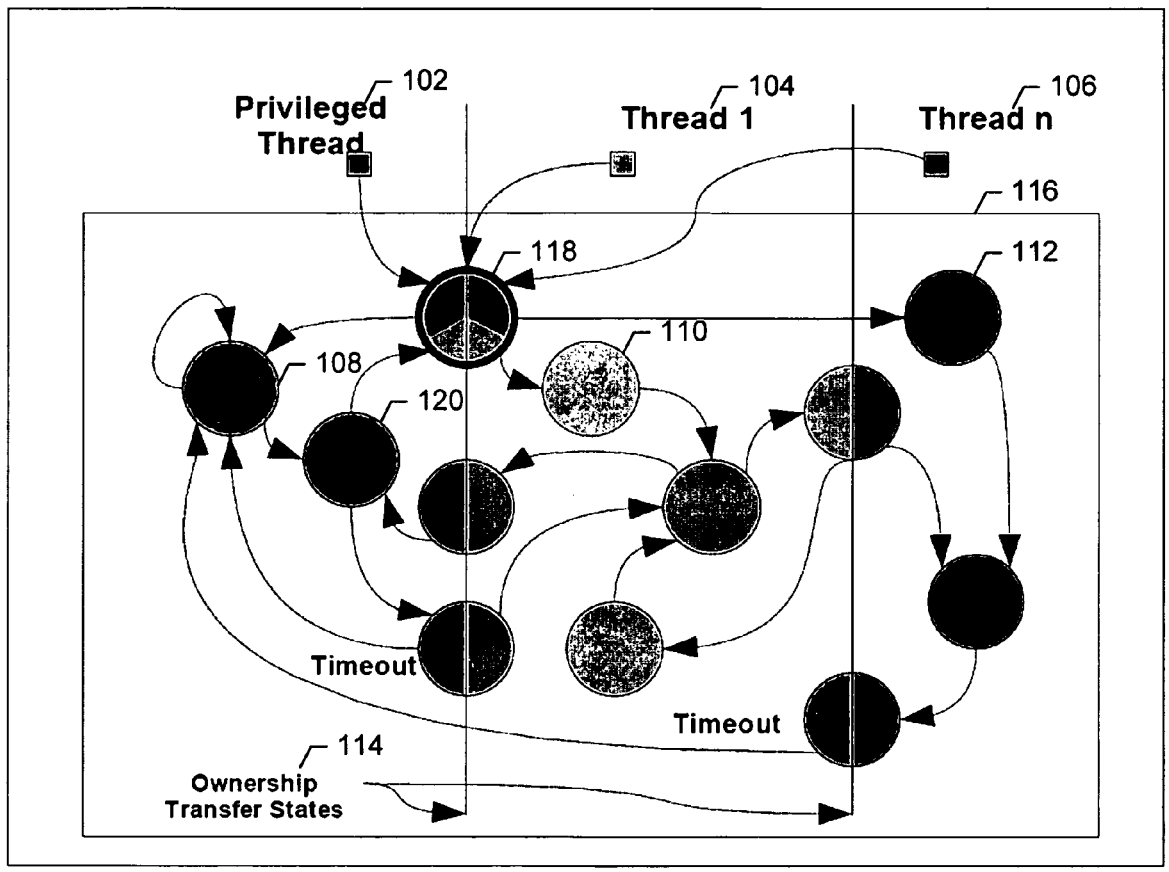
FIGS. 1-2 show schematic diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for managing sharing of resources in real-time multi-threaded environments. Specifically, embodiments of the invention provide a method and apparatus for managing producer and consumer control thread operations using a state-sharing sequence control engine. Within the context of the invention, producer and consumer threads interact causally with one another; a producer executes a first control action, and a consumer responds to with a second control action. Those skilled in the art will appreciate that interaction between producer and consumer threads does not necessitate the explicit "shared buffer" of typical producer/consumer examples. Anything within a computer system or network, including regions of memory, file systems, CPUs, buses, etc., may constitute resources to be shared among threads.

In one or more embodiments of the invention, the state-sharing sequence control engine is implemented on a finite state machine containing a plurality of states owned by different threads. Resource-sharing threads are regulated both by the states in the finite state machine and by setting wake and sleep periods for each thread. A thread is allowed to perform operations if upon waking, the thread has ownership of the current state. Once a thread has finished operations, the state is updated and the thread goes back to sleep. This prevents spaghetti-like code and desynchronization, allows process termination once a thread goes to sleep, greatly reduces the state space of the system, and provides a more extensible and bug-free environment for development and debugging.

FIG. 1 shows a schematic diagram of a finite state machine employing state sharing between threads in accordance with one or more embodiments of the invention. Unlike typical producer-consumer models, where sharing of resources must be synchronized carefully between threads, the finite state machine inherently contains restrictions that enforce mutual exclusion of threads from critical sections. In other words, no two threads are allowed to control shared resources at the same time, thus preventing timing and access issues associated with conventional producer/consumer implementations. In addition, because all threads are run on one instance of the finite state machine, the state space is reduced to a function of the number of states in the finite state machine, as opposed to the product of all states belonging to each thread. In other words, if three threads each had 10 states, the state space of the system would be on the order of 1,000 states in a traditional implementation, whereas the present invention would have a state space of only about 30 states. Code produced under the framework of the present invention is more robust and extensible, more easily validated, and more easily debugged than traditional implementations of real-time multithreaded control sequences.

As shown in FIG. 1, the finite state machine contains a set of threads (privileged thread (102), thread 1 (104), thread n (106)) and a set of states (116). In one or more embodiments of the invention, the privileged thread (102) is the thread that currently has control and is allowed to execute. Those skilled in the art will appreciate that once another thread assumes control, that thread becomes the privileged thread (102). As a result, there will be times when thread 1 (104) will become the privileged thread (102) and other times when thread n (106) will become the privileged thread.

In one or more embodiments of the invention, a single state variable (i.e. current state) and next state logic is used for all participating threads. In order to allow each thread to execute, state-sharing is employed. In state sharing, each thread corresponds to a set of states that thread has ownership over. A state that is completely owned by one thread is called a control state (108, 110, 112), and a state that is shared amongst threads is called an ownership transfer state (114). A thread is not allowed to execute if the thread does not have ownership of a state, and an ownership transfer state allows one thread to relinquish control of the finite state machine and another to take over the finite state machine and execute a control operation. In one or more embodiments of the invention, control states (108, 110, 112) correspond to periods where a thread is accessing a critical section, or shared resource. Because no other threads can claim ownership of a control state other than the one the control state is assigned to, control of shared resources is restricted to the privileged thread and thus mutual exclusion of critical sections is implemented.

Those skilled in the art will appreciate that while traditional mutual exclusion mechanisms are implemented using a single function that only keeps information about the state of access of a shared resource, embodiments of the present invention implement a mutual exclusion mechanism that contains explicit information about the current control state of the privileged thread, as well as the access state of the privileged thread. For example, a traditional real-time multithreaded implementation may only indicate whether a shared resource is being accessed or not, whereas the current state of the finite state machine in the present invention may contain information about the thread accessing the shared resource and the type of operation performed on the shared resource.

In one or more embodiments of the invention, threads (privileged thread (102), thread 1 (104), thread n (106)) cycle through sleep and wake periods. When a thread is awake and can claim ownership of the current state, the thread will execute a control operation until its next scheduled sleep period. Those skilled in the art will appreciate that a control operation for a producer thread may involve executing a first operation in a real-time multithreaded environment, while a control operation for a consumer thread may involve reacting to the first operation by the producer thread with a second operation in the real-time multithreaded environment. For example, a producer thread may be outputting a square wave signal, which is then modulated by a consumer thread. Once a control operation is completed by the thread, the thread will cycle the finite state machine to another state, until eventually an ownership transfer state (114) is reached. This allows another thread to take ownership of the finite state machine and cycle to new states that are owned by that thread.

For example, if the current state corresponded to a control state of the privileged thread (108), the privileged thread (102) could execute a set of instructions and transition to another state (120) before going to sleep. During this time, any other thread (thread 1 (104), thread n (106)) entering its wake period would check the current state and discover that it does not have ownership of that state. Those threads (thread 1 (104), thread n (106)) would then go back to sleep and wake up after the sleep period to check again. Once the privileged thread (102) wakes and completes operations, it may cycle to an ownership transfer state (118) and go to sleep. Other threads (thread 1 (104), thread n (106)) may then wake and assume control of the finite state machine. If thread 1 (104) were to wake first, thread 1 would cycle the finite state machine to a control state (110) it owned and execute its own set of instructions before transitioning to an ownership transfer state (114), alternating between sleep and wake periods as it does. If thread n (106) were to wake first, it would also begin its own sequence, cycling to a control state (112) it had ownership of, alternating periods of executing instructions and sleeping, until it transitioned to another ownership transfer state (114).

In one or more embodiments of the invention, a privileged thread (102) that cycles to an ownership transfer state (114) may employ a watchdog clock (not shown) that will allow the privileged thread to regain control of the finite state machine if a new thread (thread 1 (104), thread n (106)) never responds. Furthermore, in one or more embodiments of the invention, sleep and wake periods of threads may be changed based on conditions. For example, if the privileged thread (102) is the only one left executing and all other threads (thread 1 (104), thread n (106)) have completed execution and exited the finite state machine, then the sleep period for the privileged thread (102) may be omitted so that it may complete operations more quickly.

Figure 2:
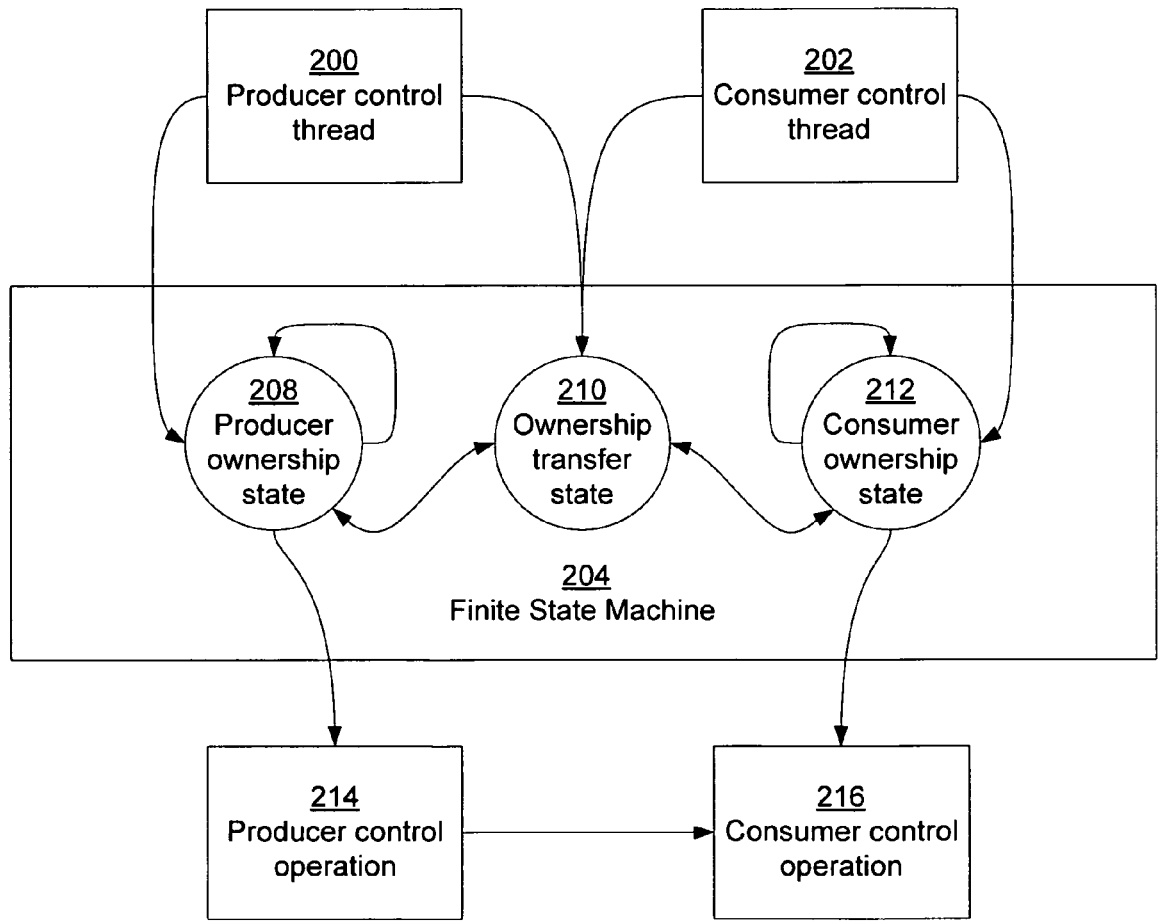

FIG. 2 shows a schematic diagram of a system for controlling multithreaded access to shared resources in accordance with one or more embodiments of the invention. As shown in FIG. 2, the system includes a producer control thread (200), a consumer control thread (202), a finite state machine (204), a producer control operation (214), and a consumer control operation (216). The producer control thread (200) and consumer control thread (202) perform their control operations (e.g. producer control operation (214), consumer control operation(216)) through the finite state machine (204). Those skilled in the art will appreciate that embodiments of the invention may contain multiple producer control threads (200), multiple consumer control threads (202), and multiple control operations associated with the threads (e.g. producer control operation (214), consumer control operation(216)).

A producer control thread (200) corresponds to any thread that performs a producer control operation (214). For example, a producer control thread (200) may execute a set of instructions within a multithreaded real-time environment. A consumer control thread (202) corresponds to any thread that performs a consumer control operation (216). For example, a consumer control thread (202) may execute a set of instructions that reacts to a producer control operation (214) within a real-time multithreaded environment. Those skilled in the art will appreciate that a thread may be both a producer control thread (200) and a consumer control thread (202).

A producer control operation (214) pertains to any operation carried out by a producer control thread (200) which precedes a consumer control operation (216). Similarly, a consumer control operation (216) relates to any operation carried out by a consumer control thread (202) that interacts with and follows a producer control operation (214). Those skilled in the art will appreciate that a control operation may be both a producer control operation (214) and a consumer control operation (216). As an example, consider a software pipeline. Each stage of the pipeline is operated by a thread, and stages of the pipeline are executed sequentially. Consequently, a thread operating stage n of the pipeline performs a producer control operation (214) for the thread operating stage n+1, and at the same time performs a consumer control operation (216) for the thread operating stage n−1.

The finite state machine (204) contains a producer ownership state (208), an ownership transfer state (210), and a consumer ownership state (212). As shown in FIG. 1, one or more embodiments of the invention may employ multiple producer ownership states, ownership transfer states, and consumer ownership states within the finite state machine (204). A producer ownership state (208) is a state that is owned by a producer control thread (200), and a consumer ownership state is a state that is owned by a consumer control thread (202). An ownership transfer state (210) is owned by multiple threads and allows one thread to relinquish control of the finite state machine (204) and another to gain control. As stated above, in one or more embodiments of the invention, threads in the system cycle through sleep and wake periods, and a thread is allowed to perform operations if upon waking, that thread has ownership of the current state.

As shown in FIG. 2, the producer control thread (200) and consumer control thread (202) must go through the finite state machine (204) in order to perform control operations (e.g. producer control operation (214), consumer control operation (216)). While the producer control thread (200) and consumer control thread (202) both have ownership of the ownership transfer state (210), only the producer control thread (200) has ownership of the producer ownership state (208) and only the consumer control thread has ownership of the consumer ownership state (212). Those skilled in the art will appreciate that the producer ownership state (208) corresponds to a control state of the producer control thread (200) and that the consumer ownership state (212) corresponds to a control state of the consumer control thread (202).

In one or more embodiments of the invention, the producer control thread (200) is only allowed to perform a producer control operation (214) when the current state is a producer ownership state (208), and the consumer control thread (202) is only allowed to perform a consumer control operation (216) when the current state is a consumer ownership state (212). The ownership transfer state (210) is used only to allow one thread to relinquish control of the finite state machine (204) and another to gain control of the finite state machine (204). However, other embodiments of the invention may use the ownership transfer state (210) to perform other operations, such as shut down procedures for the thread relinquishing control and preparatory actions for the thread assuming control, or passing information between threads. Embodiments of the invention use one instance of the finite state machine (204) to control all resource-sharing threads (e.g. producer control thread (200), consumer control thread (202)), and only one thread may have control of the finite state machine (204) at a time. As a result, mutual exclusion between producers and consumers (e.g. producer control thread (200), consumer control thread (202)) is implemented by controlling all threads with one instance of a finite state machine (204), current state, and next state logic and restricting access to the finite state machine (204) to one thread (e.g. producer control thread (200), consumer control thread (202)) at a time.

Figure 3:
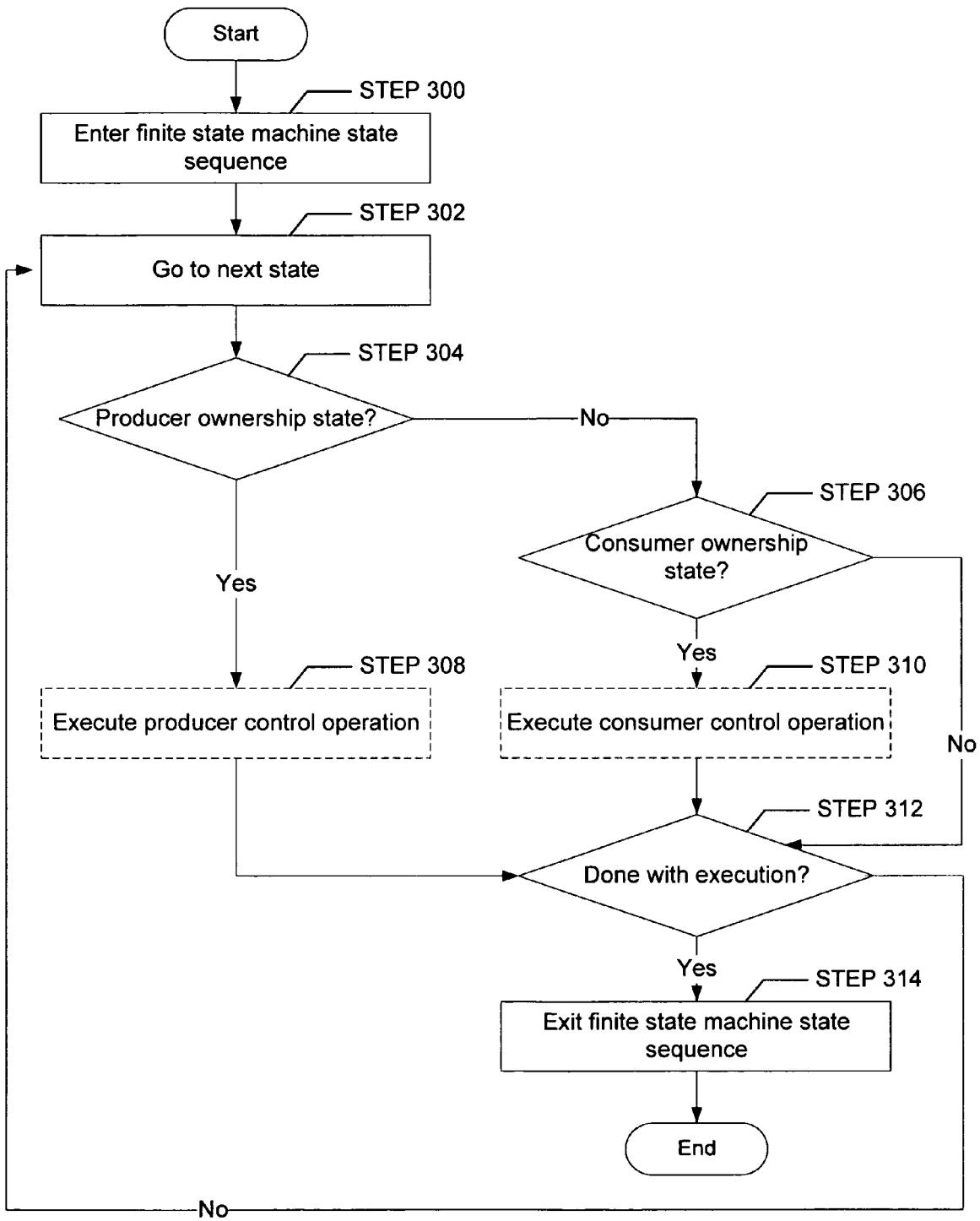
FIGS. 3-4 show flow diagrams in accordance with one or more embodiments of the invention.

FIG. 3 shows a flow diagram of real-time multithreaded execution of threads operating within a finite state machine in accordance with one or more embodiments of the invention. As stated above, a mutual exclusion policy is implemented in the finite state machine such that only one thread can access shared resources at a time.

Initially, a finite state machine state sequence is entered (Step 300). Once in the finite state machine state sequence, all threads are regulated by the finite state machine. As stated above, in one or more embodiments of the invention, threads cycle through sleep and wake periods, checking to see if they own the current state. A thread is only allowed to execute a control operation if the thread has ownership of the current state; otherwise the thread goes back to sleep and wakes up at a later period to check if the current state has been changed.

Once the finite state machine state sequence is started (Step 300), the finite state machine state sequence cycles through the states and goes to the next state (Step 302). Those skilled in the art will appreciate that upon beginning the finite state machine state sequence, the first state may be one of many start states of the finite state machine, and that subsequent states will be determined by both the structure of the finite state machine (e.g. as shown in FIG. 1) and by the actions of the threads operating within the finite state machine. For example, if the initial state is an ownership transfer state that is co-owned by all threads, the first thread to wake will transition the current state to one of its control states, which are different for each thread.

Once the finite state machine has transitioned to the next state (Step 302), a check is made to determine whether the next state is a producer ownership state (Step 304) or a consumer ownership state (Step 306). If the next state is a producer ownership state, a producer control operation is executed (Step 308). If the next state is a consumer ownership state, a consumer control operation is executed (Step 310). Those skilled in the art will appreciate that control operations relevant to sharing resources between multiple threads do not have to be performed in every producer ownership state or consumer ownership state, and that other actions pertaining to single threads, such as preparations, calculations, or shut down operations, may take place instead. Further, as stated above, the finite state machine may regulate more than one producer thread and one consumer thread, and threads may occupy multiple interconnected producer and consumer roles. For example, a particular thread's control operation may function as a consumer control operation that follows producer control operations for two other threads and as a producer control operation that precedes consumer control operations for three other threads.

Once the actions associated with the current state are complete (e.g. execute producer control operation (Step 308), execute consumer control operation (Step 310)), a check is made to see if execution is complete (Step 312). If not, the finite state machine cycles to the next state (Step 302) and the actions associated with that state are performed. Otherwise, if all actions associated with the real-time multithreaded shared resource access are complete, the finite state machine state sequence is ended (314). In one or more embodiments of the invention, the end of the finite state machine state sequence is associated with a final state of the finite state machine. Those skilled in the art will appreciate that as with the start states, the finite state machine may contain multiple final states.

Figure 4:
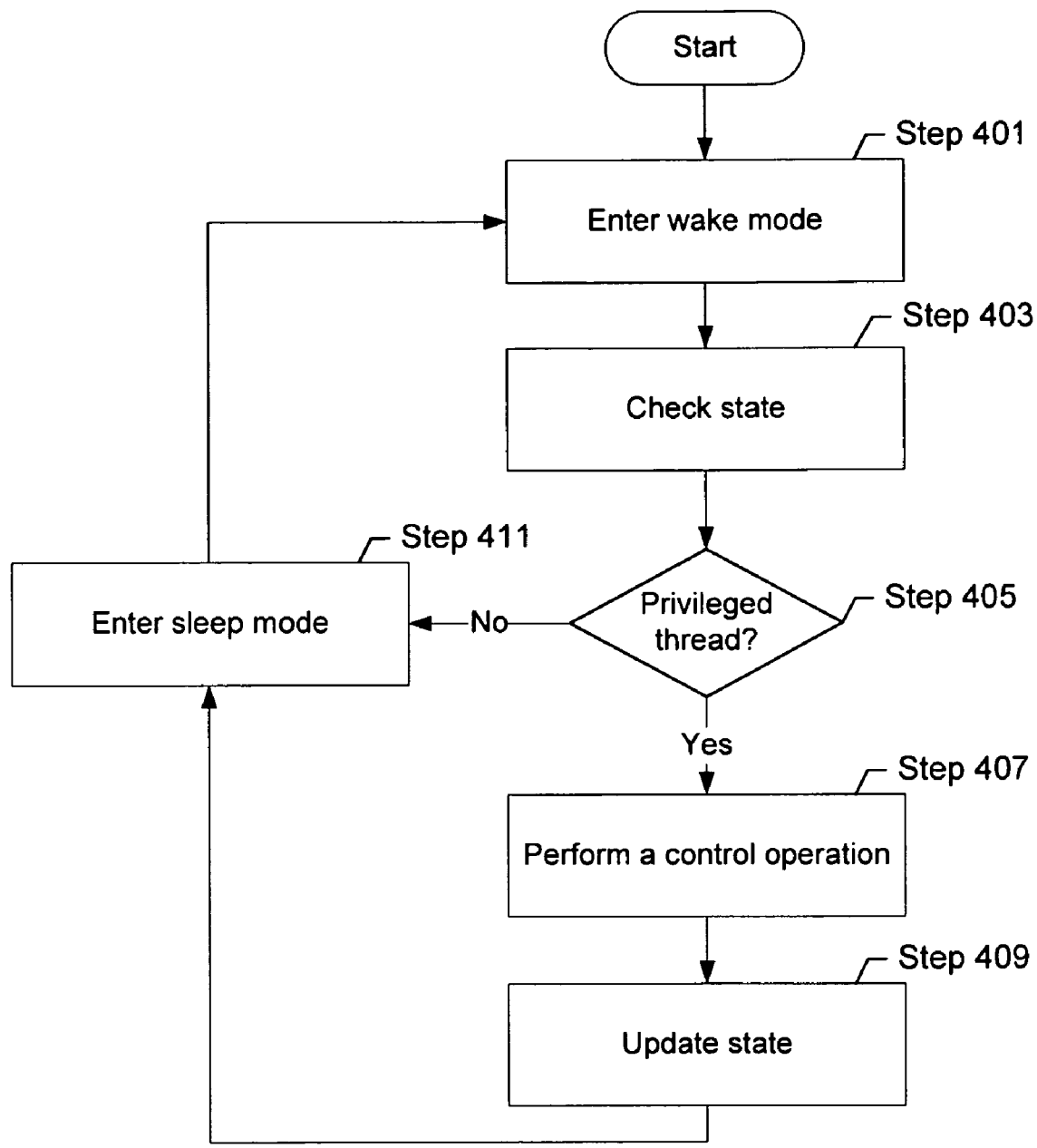

FIG. 4 shows a flow diagram of a thread operating within a finite state machine in accordance with one or more embodiments of the invention. As stated above, in one or more embodiments of the invention, each thread is timed to sleep and wake over set periods. Threads are inactive when asleep and can only execute instructions when awake. Those skilled in the art will appreciate that sleep and wake periods of threads do not need to be related for the invention to work.

First, a thread must enter its wake mode (Step 401). Once the thread is awake, the thread checks the current state of the finite state machine (Step 403). As stated above, in one or more embodiments of the invention, a single state variable and next state logic is maintained for all participating threads. Once the thread has identified the current state, the thread executes the next state code, which is the same for all threads. Different actions are taken based on whether the thread is the privileged thread or not (Step 405). If the thread is not the privileged thread, the thread goes back to sleep (Step 411) and wakes up after its sleep cycle to check the state again. When the current state is a control state of a particular thread, only that thread is allowed to execute instructions. All other threads will wake up, check the current state, go back to sleep and repeat until the current state has been transitioned to an ownership transfer state, which will allow another thread to take control.

If the thread is the privileged thread, the thread may perform a control operation (Step 407). For example, the thread may perform an operation related to the sharing of resources with other threads, or the thread may perform preparatory or clean-up actions. Once the thread has performed its control operation (Step 407), the thread updates the state (Step 409) in the finite state machine. The state may be updated to another control state of the thread, or the state may be updated to an ownership transfer state, which would allow other threads to take over the finite state machine. Once the state is updated, the thread enters a sleep cycle (Step 411) and relinquishes control of the finite state machine.

Figure 5:
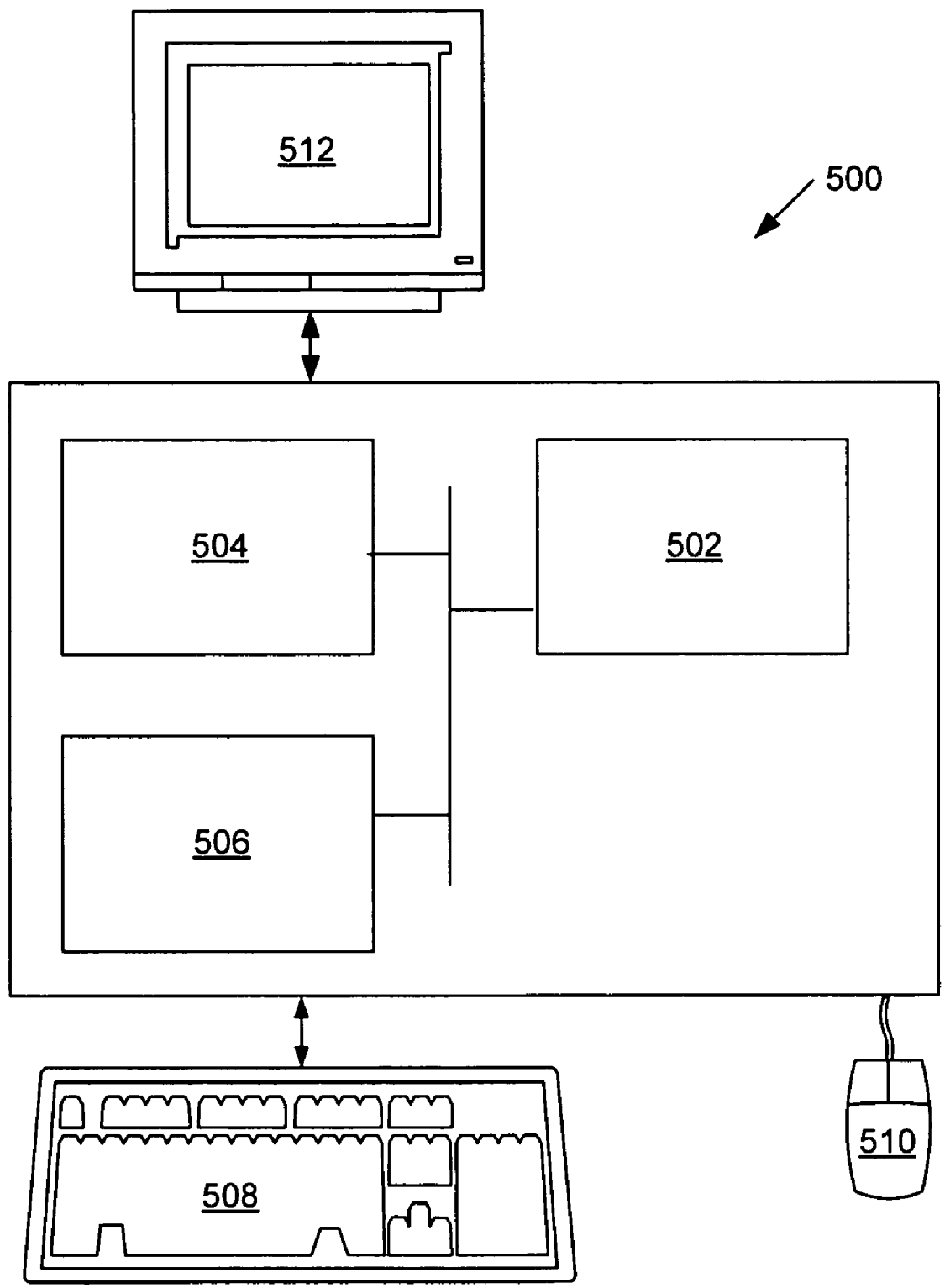
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g. finite state machine, producer threads, consumer threads, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlling sharing of resources in a multithreaded environment, comprising:
   entering a finite state machine state sequence;
   controlling resource-sharing threads using the finite state machine state sequence;
   employing state sharing in the finite state machine state sequence, which comprises:
      a plurality of control states, wherein only one thread, a privileged thread, has complete ownership of a control state; and
      a plurality of ownership transfer states, wherein a plurality of threads each has ownership of an ownership transfer state;
   exiting the finite state machine state sequence when shared resource control is complete;
   providing a wake mode of a thread, wherein the thread checks for ownership of a current state of the finite state machine state sequence,
      wherein the wake mode further comprises:
         a non-ownership of the current state of the finite state machine state sequence by a thread, wherein the thread relinquishes control of the finite state machine; and
         an ownership of the current state of the finite state machine state sequence by a thread, comprising:
            performing of a control operation by the thread; and
            updating of the current state; and
   providing a sleep mode of a thread, wherein the thread is inactive.

2. The method of claim 1, the resource-sharing threads further comprising:
   a plurality of producer threads performing actions to control shared resources; and a plurality of consumer threads responding to the producer threads performing actions to control shared resources.

3. The method of claim 1, wherein a previous thread takes ownership of the current state when a new thread does not take control of the current state within a specified time period.

4. The method of claim 1, wherein timeout conditions cause the finite state machine state sequence to return to a well-known state.

5. The method of claim 1, wherein timeout conditions cause the finite state machine state sequence to return to a well-known state.

6. A non-transitory computer usable medium having computer readable program code embodied therein for causing a computer system to execute a method for controlling sharing of resources in a multi-threaded environment, comprising:
   entering a finite state machine state sequence;
   controlling resource-sharing threads using the finite state machine state sequence;
   employing state sharing in the finite state machine state sequence, which comprises:
      a plurality of control states, wherein only one thread, a privileged thread, has complete ownership of a control state; and
      a plurality of ownership transfer states, wherein a plurality of threads each has ownership of an ownership transfer state;
   exiting the finite state machine state sequence when shared resource control is complete;
   providing a wake mode of a thread, wherein the thread checks for ownership of a current state of the finite state machine state sequence,
   wherein the wake mode further comprises:
      a non-ownership of the current state of the finite state machine state sequence, wherein the thread relinquishes control of the finite state machine; and
      an ownership of the current state of the finite state machine state sequence, comprising:
         performing of a control operation by the thread; and
         updating of the current state; and
   providing a sleep mode of a thread, wherein the thread is inactive.

7. The computer usable medium of claim 6, the resource-sharing threads further comprising:
   a plurality of producer threads performing actions to control shared resources; and
   a plurality of consumer threads responding to the producer threads performing actions to control shared resources.

8. The computer usable medium of claim 6, wherein a previous thread takes ownership of the current state when a new thread does not take control within a specified time period.

9. The computer usable medium of claim 6, wherein timeout conditions cause the finite state machine state sequence to return to a well-known state.

10. The computer usable medium of claim 6, wherein the finite state machine state sequence is executed on a single instance of a finite state machine.

* * * * *